(12) United States Patent
Pöchmüller

(10) Patent No.: US 7,726,434 B2
(45) Date of Patent: Jun. 1, 2010

(54) HOLDING DEVICE AND METHOD FOR DETECTING A VEHICLE ENVIRONMENT WITH AT LEAST ONE CAMERA

(75) Inventor: Werner Pöchmüller, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/979,349

(22) PCT Filed: Feb. 24, 2001

(86) PCT No.: PCT/DE01/00723

§ 371 (c)(1), (2), (4) Date: Mar. 22, 2002

(87) PCT Pub. No.: WO01/68403

PCT Pub. Date: Sep. 20, 2001

(65) Prior Publication Data

US 2002/0113415 A1   Aug. 22, 2002

(30) Foreign Application Priority Data

Mar. 17, 2000  (DE) ................................ 100 13 425

(51) Int. Cl.
*B60K 28/10* (2006.01)
(52) U.S. Cl. ................... 180/281; 348/148; 348/151
(58) Field of Classification Search .............. 280/762, 280/761; 180/281, 286, 289, 167; 296/15; 239/284.1, 284.2; 340/937, 932.2; 348/149, 348/148, 118, 151, 143; 362/527
See application file for complete search history.

(56) References Cited

U.S. PATENT DOCUMENTS

| | | | | | |
|---|---|---|---|---|---|
| 4,093,364 | A | * | 6/1978 | Miller | 352/132 |
| 4,152,694 | A | * | 5/1979 | Toles | 340/463 |
| 4,420,238 | A | * | 12/1983 | Felix | 396/427 |
| 4,855,878 | A | | 8/1989 | Vu et al. | |
| 4,910,591 | A | * | 3/1990 | Petrossian et al. | 358/103 |
| 4,911,545 | A | * | 3/1990 | Miller | 350/604 |
| 5,023,760 | A | * | 6/1991 | Izuno | 362/485 |
| 5,027,200 | A | * | 6/1991 | Petrossian et al. | 358/103 |
| 5,052,714 | A | * | 10/1991 | Muscat et al. | 280/762 |
| 5,121,200 | A | * | 6/1992 | Choi | 358/103 |
| 5,289,321 | A | * | 2/1994 | Secor | 359/896 |
| 5,303,971 | A | * | 4/1994 | Johnsen et al. | 296/50 |
| 5,560,659 | A | * | 10/1996 | Dault | 292/336.3 |

(Continued)

FOREIGN PATENT DOCUMENTS

DE   91 06 201   7/1991

(Continued)

*Primary Examiner*—Jeffrey J Restifo
(74) *Attorney, Agent, or Firm*—Kenyon & Kenyon LLP

(57) ABSTRACT

A holding fixture for a camera and a method for monitoring the surrounding area of a vehicle, using at least one camera, which is used to draw a holding fixture out of the body shell of a vehicle, as needed. The holding fixture is extended as a function of a speed signal or a transmission-setting signal, and, in addition to a camera, the holding fixture has a further device, in particular a washer device or a trunk handle. Furthermore, the holding fixture can be drawn out as a function of a signal from a control element. Holding fixtures having cameras can be attached at various positions of the vehicle.

14 Claims, 4 Drawing Sheets

U.S. PATENT DOCUMENTS

| | | | | |
|---|---|---|---|---|
| 5,574,443 | A * | 11/1996 | Hsieh | 340/901 |
| 5,769,323 | A * | 6/1998 | Hartick et al. | 239/284.2 |
| 5,793,420 | A * | 8/1998 | Schmidt | 348/148 |
| 5,904,385 | A * | 5/1999 | Linder | 292/336.3 |
| 6,144,296 | A * | 11/2000 | Ishida et al. | 340/461 |
| 6,151,065 | A * | 11/2000 | Steed et al. | 348/148 |
| 6,152,385 | A * | 11/2000 | Nuber et al. | 239/284.2 |
| 6,175,300 | B1 * | 1/2001 | Knedrick | 340/436 |
| 6,189,808 | B1 * | 2/2001 | Daniels et al. | 239/284.2 |
| 6,222,447 | B1 * | 4/2001 | Schofield et al. | 340/461 |
| 6,234,410 | B1 * | 5/2001 | Martin et al. | 239/284.2 |
| 6,250,766 | B1 * | 6/2001 | Strumolo et al. | 359/857 |
| 6,320,612 | B1 * | 11/2001 | Young | 348/148 |
| 6,357,883 | B1 * | 3/2002 | Strumolo et al. | 359/857 |
| 6,384,741 | B1 * | 5/2002 | O'Leary | 340/937 |
| 6,454,325 | B1 * | 9/2002 | Ramsey et al. | 292/347 |
| 6,473,001 | B1 * | 10/2002 | Blum | 340/937 |
| 6,477,334 | B1 * | 11/2002 | Chen | 396/429 |
| 6,524,020 | B2 * | 2/2003 | Ellinger et al. | 396/419 |
| 6,593,960 | B1 * | 7/2003 | Sugimoto et al. | 348/148 |
| 7,108,301 | B2 * | 9/2006 | Louvel | 292/336.3 |
| 7,195,385 | B2 * | 3/2007 | Zimmermann et al. | 362/540 |
| 2007/0182817 | A1 * | 8/2007 | Briggance | 348/118 |

FOREIGN PATENT DOCUMENTS

| | | |
|---|---|---|
| DE | 298 07 969 | 8/1998 |
| JP | 3-189247 | 8/1991 |

\* cited by examiner

HOLDING DEVICE AND METHOD FOR DETECTING A VEHICLE ENVIRONMENT WITH AT LEAST ONE CAMERA

FIELD OF THE INVENTION

The present invention relates to a holding fixture and a method for monitoring the surrounding area of a vehicle, using at least one camera.

BACKGROUND INFORMATION

Parking assistance systems for monitoring the surrounding area of a vehicle are known, which use, on one hand, radar, and on the other hand, ultrasonic sensors. In addition, the use of cameras is known for monitoring the surrounding area of a vehicle, the cameras occupying a fixed position in the vehicle, and furthermore, the position being selected so that the camera does not have any optically non-transparent obstacles in its field of view, due to the vehicle.

SUMMARY OF THE INVENTION

In contrast, the holding fixture of the present invention, and the method of the present invention for monitoring the surrounding area of a vehicle, using at least one camera, have the advantage that, because the camera can be drawn out by the holding fixture of the present invention, an optimum monitoring position is selected on the vehicle for monitoring the surrounding area of the vehicle, without effecting the vehicle design itself. In the retracted state, the holding fixture advantageously disappears in the body shell of the vehicle. In this context, it is also advantageous that the at least one camera is protected from soiling, when it is not needed.

In addition to a camera, it is particularly advantageous that the holding fixture of the present invention accommodates a further device, which allows the overall outlay to be reduced. Such an additional device can be, on one hand, a trunk handle and, on the other hand, a washer device, each of which can likewise be drawn out on the vehicle. This advantageously allows the camera to be mounted in a very simple manner.

Furthermore, it is advantageous that the holding fixture of the present invention is automatically extended as a function of a speed signal; in this case, the holding fixture only being drawn out at low speeds that especially occur during a parking maneuver, and in this instance, the camera is on the holding fixture.

In addition, it is advantageous that the holding apparatus of the present invention is drawn out as a function of a transmission-setting signal. Consequently, the holding fixture is particularly drawn out in response to shifting into reverse or first gear. These two gears of a vehicle gearshift mechanism are used in parking or leaving a parking space. Consequently, the driver is automatically offered this additional help for monitoring the surrounding area of a vehicle. This decidedly increases the safety while parking. In this context, it is particularly advantageous that signals from the camera are only displayed in the travel direction, so that the driver is only provided with information that he or she needs for steering.

Furthermore, it is advantageous that the holding fixture of the present invention can be drawn out, using a control element that the driver operates. Consequently, in a case where the driver needs the camera to monitor the vehicle surroundings, but this does not occur automatically, it is possible for him to initiate this himself, using the operating device. Thus, the holding fixture of the present invention is at the disposal of the driver in all situations.

In addition, it is advantageous that the holding fixture of the present invention is placed at the roof edge or the trunk edge of the vehicle, thereby allowing a good view, which is very useful for detecting approaching persons and monitoring the further surroundings, especially when backing into a parking space. This decidedly increases the safety of the device according to the present invention.

In addition, it is advantageous that the holding fixture of the present invention is simultaneously placed at various positions of the vehicle, so that a driver is ensured that the surrounding area of the vehicle is monitored in a comprehensive manner, the driver being able to control the monitoring of the vehicle surroundings as needed, using the camera.

Furthermore, it is advantageous for a camera to be integrated in the emblem of a vehicle manufacturer, whereby the emblem is situated on the trunk lid of the vehicle. The advantage resulting from this is that the emblem hides the edges of the extendable or collapsible holding fixture. In addition, the camera position is relatively high, thereby resulting in excellent monitoring of the vehicle surroundings.

Furthermore, it is advantageous that the holding fixture of the present invention is simultaneously drawn out at both the front and rear ends of the vehicle, and that a display then occurs as a function of the direction of travel, in order to supply the driver with information. This decidedly increases driving safety, especially when parking in parking spaces.

Furthermore, it is advantageous that the holding fixture of the present invention is only moved out in response to shifting into reverse, and indeed, in both the forward and reverse directions. The holding fixture is then either retracted in response to shifting into a forward gear, and possibly in response to a predefined speed value being exceeded. This increases the probability that the holding fixture is only drawn out during parking maneuvers, which by far represent the most frequent use of the cameras. Thus, the occurrences of uselessly extending the holding fixture of the present invention are reduced.

Finally, it is also advantageous that the holding fixture of the present invention is extended while driving backwards, and brought in while driving forwards. Consequently, only the reverse gear is used as a condition for monitoring the vehicle surroundings, using at least one camera.

DETAILED DESCRIPTION

In the case of introducing cameras or video sensors for monitoring the surrounding area of a vehicle, it is crucial how these sensors are positioned. In this context, the optical view into the area to be monitored is free, simple mounting is possible, the costs are low, and the design is optically attractive.

Only a few advantageous positions on a vehicle are useful for making do with as few cameras or video sensors as possible and, in so doing, still ensuring optimum monitoring of the vehicle surroundings. These positions are situated as centrally as possible, at points high up on the vehicle, e.g. the roof edge, the trunk lid, the rear window, and the hood. Therefore, the present invention provides for the camera or video sensors being installed at optimum monitoring positions, using an extendable holding fixture, without having a negative influence on the vehicle design. In this context, the camera lens is also protected from soiling in normal vehicle operation. Cost-effective integration into the vehicle is rendered possible by the combination with elements present in the vehicle. Therefore, the holding fixture of the present invention is designed to be extendable as a function of driving situations.

Figure 1:
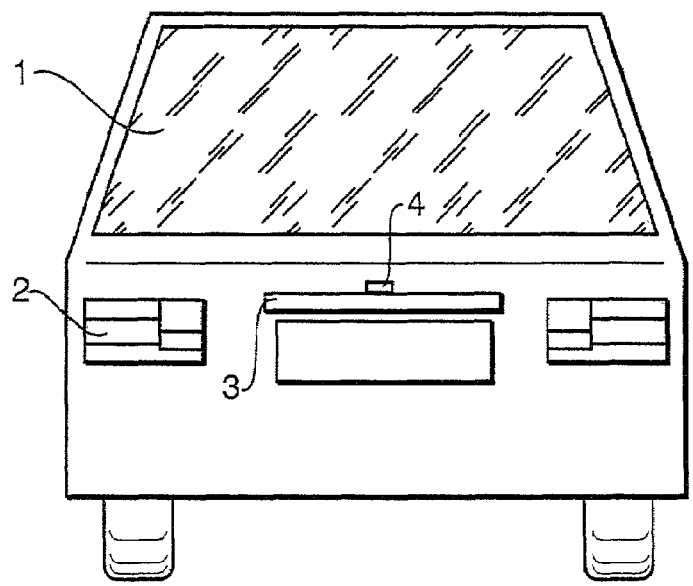
FIG. 1 shows a rear view of a vehicle.

The rear view of a vehicle is represented in FIG. 1, the holding fixture of the present invention being integrated into the vehicle rear end. FIG. 1 represents the view of a rear window 1, along with tail lights 2. A holding fixture of the present invention, which is for mounting a camera, is mounted in support 3, which is provided for accommodating both a trunk handle and license-plate illumination. In this case, holding fixture 4 of the present invention is centrally mounted at the rear end of the vehicle. This allows for an optimum field of view for the camera, which is situated on holding fixture 4. In this instance, the camera is advantageously together with the trunk handle, on holding fixture 4. It is alternatively possible for holding fixture 4 to only support the camera.

Figure 2:
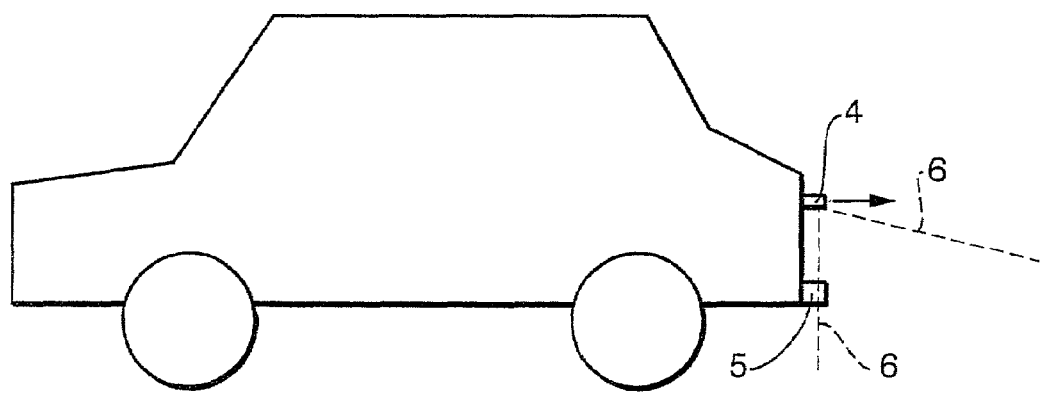
FIG. 2 shows the extended holding fixture of the present invention, at the rear end of the vehicle.

Schematically represented in FIG. 2 is a side view of the vehicle, showing extended holding fixture 4 of the present invention at the rear end of the vehicle. In this context, holding fixture 4 is attached to the vehicle in such a manner, that the holding fixture the field of view described by the coverage angle between dashed lines 6. Consequently, bumper 5 of the vehicle and the lower, rearward space behind the vehicle are in the field of view of the camera, as an aid for orientation.

Figure 3:
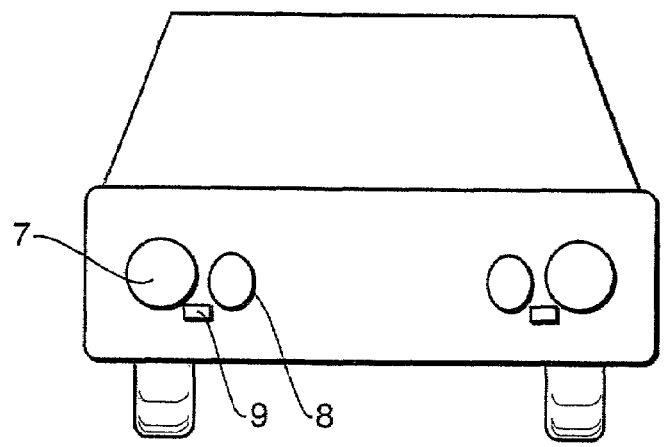
FIG. 3 shows the view of a vehicle front end.

A front view of the vehicle is represented in FIG. 3, the holding fixture of the present invention being positioned in the vehicle front end. A support 9, which is intended for a washer system, is situated between headlights 7 and 8. And now, support 9 also has the holding fixture for the camera itself. In this context, the extendable holding fixture, which is moved out by electric motors, can be controlled by a processor of the vehicle. The holding fixture can alternatively be folded out.

In this case, the holding fixture therefore has the camera as well as the wiper device. As an alternative, it is also possible here to separately attach each of the holding fixtures for the wiper system and the camera, to support 9. The cameras are robust and installed in a water-tight manner, where a casing, sealing, or a seal can be provided.

Figure 4:
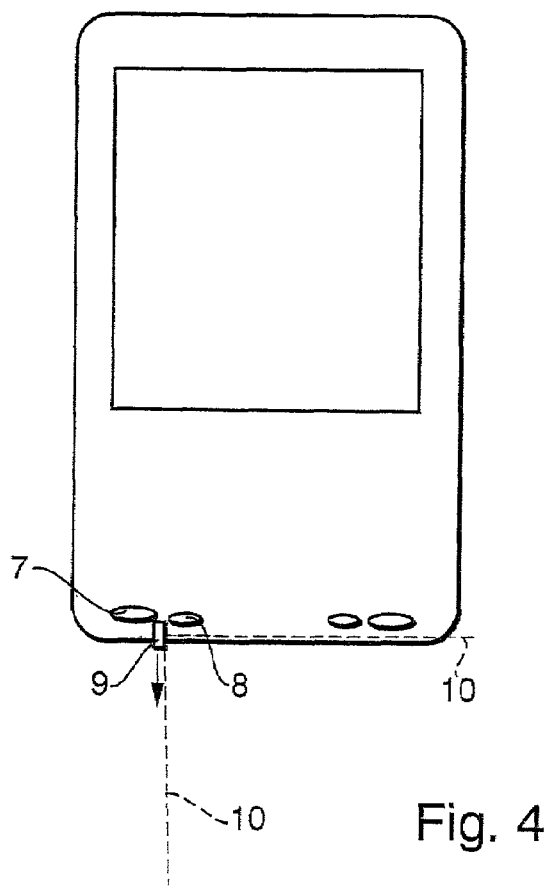
FIG. 4 shows the bird's-eye view of the vehicle, having a holding apparatus of the present invention extending from the vehicle front end.

FIG. 4 represents a bird's-eye view of the vehicle, with holding fixture 9 extending from the vehicle front end. The camera or video transmitter on holding fixture 9 is positioned and designed to have, as a field of view, an angular coverage defined by the two lines 10. In this context, the front end of the vehicle is used as an aid for orientation. However, other coverage angles are alternatively possible, depending on the design and placement of the camera or video sensor. For example, the front bumper of the vehicle can be used as an aid for orientation. In placing the holding fixture in the front end of the vehicle, it is possible to either use just one holding fixture together with a wiper device, or to mount a holding fixture for a camera in both supports. The holding fixture can also be positioned separately from the wiper device, and indeed, in the center of the vehicle front end, in order to ensure a better monitoring point for the extendable camera, and to provide separation from the wiper device, which can create problems for the camera lens system and the electronics.

The holding fixtures of the present invention can be mounted in the vehicle front end and the vehicle rear end in combination, or also just mounted in the vehicle rear end, since the rear view of a vehicle especially involves a potential danger for a driver. In this context, the holding fixture of the present invention is attached so as to disappear in the body shell of the vehicle in the retracted state.

Figure 5:
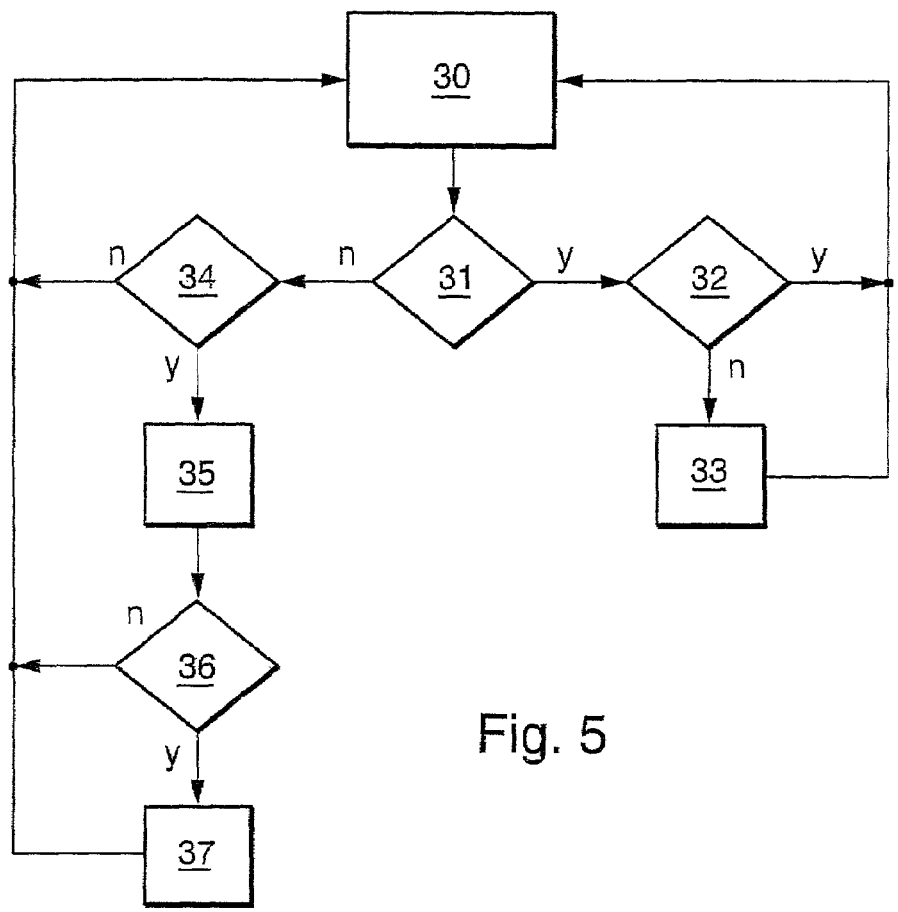
FIG. 5 shows a flow chart of a first method according to the present invention.

Represented in FIG. 5 is a flow chart for a first method according to the present invention. The position of the vehicle transmission is determined in method step 30. Therefore, the transmission-setting signal is checked. In method step 31, it is checked whether or not the reverse gear is engaged. If this is the case, then it is checked in method step 32, if the camera or cameras, if a plurality is present, have already been drawn out. If the cameras are extended and the reverse gear is engaged, then method step 30 is repeated to monitor the surrounding area of the vehicle, e.g. in the case of parking or leaving a parking space. If the camera or cameras is or are not extended, then the camera or cameras is or are drawn out in method step 33, whereupon method step 30 is repeated.

Is it is determined in method step 31, that the reverse gear is not engaged, then it is checked in method step 34, if the camera or cameras is or are already extended. If this is not the case, then method step 30 is repeated. However, if the camera or cameras is or are already drawn out, then the speed of the vehicle is determined in method step 35, and, in method step 36, the speed is then compared to a threshold value.

The threshold value is preselected in such a manner, that the failure to attain the threshold value suggests a parking situation or a situation in which a parking space is being vacated, and thus anticipates, at a high probability, that camera is to extended during forward travel. Therefore, a transgression of the threshold value suggests normal forward driving or a rapid parking or vacating maneuver, both of which do not appear to necessitate the use of drawn-out cameras. Therefore, step 30 is repeated, i.e. the cameras remain extended when the threshold value is not attained, and, when the threshold value is exceeded, each extended camera's holding fixture according to the present invention is retracted again in method step 37. Method step 30 is repeated after method step 37, i.e. the method begins again. The method is implemented continuously in order, on one hand, to automatically check whether the cameras are to extended and, on the other hand, to only leave the cameras extended for as long as is necessary.

Figure 6:
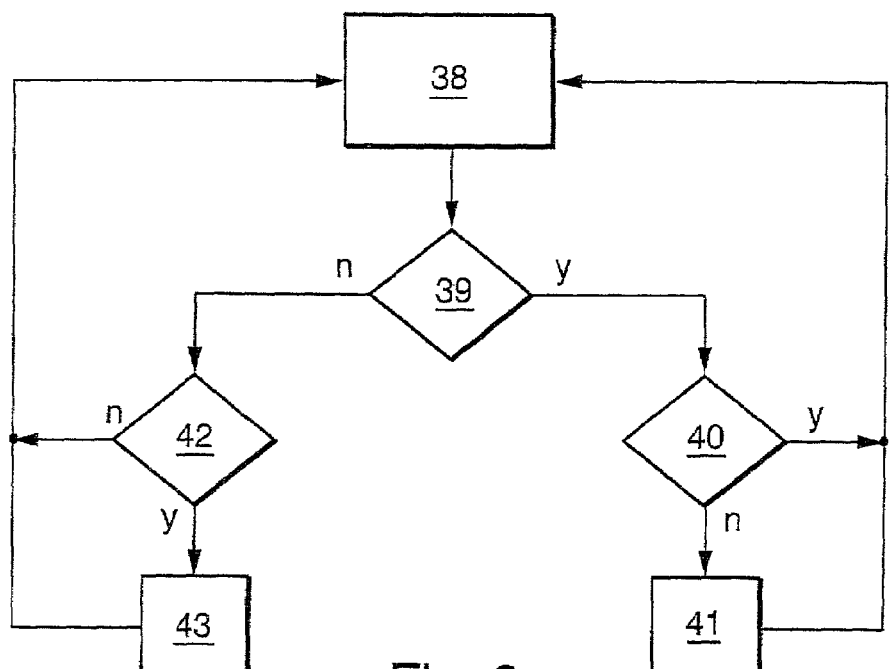
FIG. 6 shows a flow chart of a second method according to the present invention.

FIG. 6 represents a flow chart of a second method according to the present invention, for monitoring the surrounding area of a vehicle. The transmission-setting signal is detected in method step 38. In method step 39, it is checked whether or not the reverse gear is engaged. If the reverse gear is engaged, then it is checked in method step 40, if the camera or cameras is or are already extended. If this is the case, then method step 38 is repeated, since the cameras are moved out for rearward monitoring of the vehicle surroundings. But if the cameras are not extended, then the present invention's holding fixtures for the cameras at hand are drawn out in method step 41, in order to then return to method step 38.

If it is determined in method step 39, that the reverse gear is not engaged, then it is checked in method step 42, whether or not the cameras at hand have been moved out by the holding fixture of the present invention. If the cameras at hand are already extended, then the cameras at hand are retracted in method step 43, since, in this method of the present invention, cameras are only used for rearward monitoring of the vehicle surroundings. Method step 38 is repeated after method step 43. If it was determined in method step 42, that the cameras are already retracted, then method step 38 is repeated.

Figure 7:
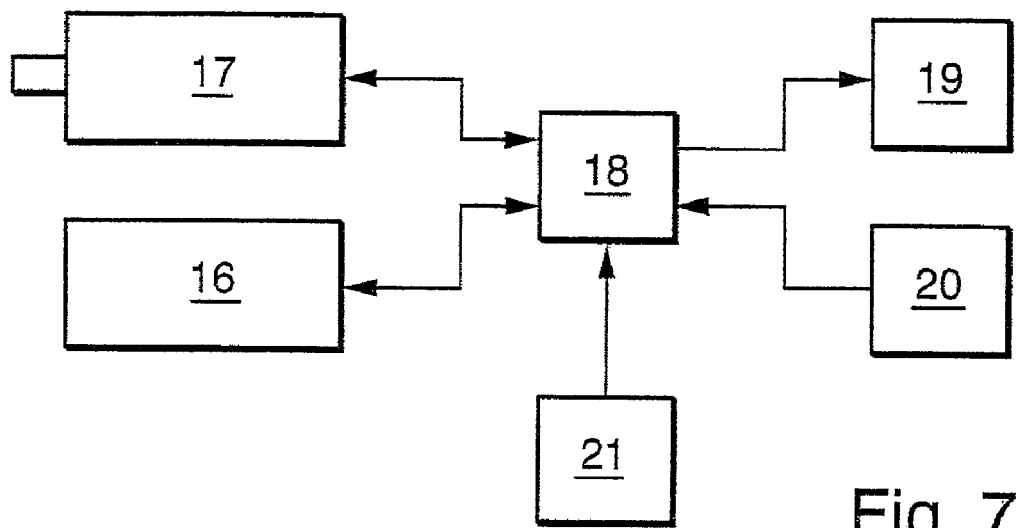
FIG. 7 shows a block diagram of a display device that uses a camera.

FIG. 7 represents a block diagram of a monitoring device in a vehicle. A camera 17 is placed on a holding fixture 16 of the present invention. Camera 17 is connected to processor 18, via a first data input/output of a processor 18. Processor 18 is connected to the holding fixture of the present invention, via its second data input/digital output. Processor 18 is connected to a display 19, via the digital output of the processor. An input device 20 is connected to a first data input of processor 18. Sensors 21 are connected to a second data input of processor 18.

Camera 17 relays received video signals to processor 18, if camera 17 was activated automatically, or was activated by input device 20. If camera 17 is activated, then camera 17 is drawn out of the body shell of the vehicle by holding fixture 16, as is represented above. According to the methods described in FIG. 5 and FIG. 6, holding fixture 16 is extended automatically, or per user input, using input device 20.

Processor 18 then moves holding fixture 16 out, when signals are emitted by sensors 21. For this purpose, sensors 21 are connected to a speed indicator, e.g. a tachometer, and to the transmission, in which case the transmission can be a manually shiftable transmission or an automatic transmission. This connection allows sensors 21 to receive the speed signal and the transmission-setting signal. In addition, sensors 21 have a memory device and evaluation electronics, in order to evaluate signals from the speed indicator and the transmission. Therefore, processor 18 implements the method of the present invention.

If more than one camera is present, then the transmission-setting signal is also used to activate the camera that is positioned in the direction of travel, as is shown in each of FIGS. 1 and 3. Processor 18 then switches through to display 19, accordingly. In this case, display 19 is a video screen, which can also be used by an infotainment system. A retinal projector or a stereoscopic video screen can alternatively be used to achieve a three-dimensional representation of the vehicle surroundings, which has a better degree of recognition and therefore results in better control of the vehicle. If a plurality of cameras is simultaneously used in different directions, then the signals of these cameras can be represented on display 19 at the same time, by appropriately dividing up the display surface.

Using input device 20 which, in this case, represents haptic operating devices, the driver can activate the holding fixture in order to monitor the vehicle surroundings by way of camera 17. Input device 20 has a sensory system and electronics, which convert the haptic inputs into electrical signals that processor 18 can interpret. As an alternative, input device 20 can be realized in the form of voice input, input device 20 then having a speech processor for converting voice signals, which are converted into electrical signals by a microphone, into data that processor 18 interprets as executive instructions.

The camera that is positioned in the rear end of the vehicle can also be integrated in the emblem of the vehicle manufacturer. An example of such an emblem is the Mercedes star. The emblem is positioned on the trunk lid. If the camera is to be drawn out, then the emblem opens up, and the holding fixture of the present invention is extended.

What is claimed is:

1. A holding fixture system for a camera on a vehicle, comprising:
   a camera;
   a holding fixture for the camera, the holding fixture being attached to a body shell of the vehicle, wherein the camera is mounted on the holding fixture, and wherein the holding fixture is configured to be selectively drawn out of the body shell as a function of a speed signal; and
   in addition to the camera, the holding fixture accommodates a further device, the further device being one of a wiper device and a trunk handle.

2. The holding fixture system according to claim 1, wherein:
   the further device is the wiper device.

3. The holding fixture system according to claim 1, wherein:
   the further device is the trunk handle.

4. The holding fixture system according to claim 1, wherein:
   the holding fixture is attached to one of a roof edge and a trunk edge of the vehicle.

5. The holding fixture system according to claim 1, wherein:
   the holding fixture is mounted in at least one of a front end of the vehicle, a rear end of the vehicle, and a roof of the vehicle.

6. The holding fixture system according to claim 1, wherein:
   the holding fixture is integrated into a vehicle-manufacturer emblem that is attached to a trunk lid.

7. A method for monitoring a surrounding area of a vehicle using at least one camera, comprising the step of:
   drawing out of a body shell of the vehicle a holding fixture for the at least one camera, wherein the camera is mounted on the holding fixture;
   wherein the at least one camera is retracted in response to a predefined speed value being exceeded.

8. The method according to claim 7, further comprising the steps of:
   simultaneously extending different holding fixtures having cameras; and
   causing a display of each of the cameras on the holding fixtures to take place in a direction of travel.

9. The method according to claim 7, wherein:
   the at least one camera is extended in response to the vehicle traveling in reverse; and
   the at least one camera is retracted again in response to forward travel.

10. A device for a vehicle, comprising:
    a first holding fixture which is retractable into a first well in a body of the vehicle and extendible beyond the body of the vehicle;
    a first camera attached to the first holding fixture and directed to a rear of the vehicle;
    a second holding fixture which is retractable into a second well in the body of the vehicle and extendible beyond the body of the vehicle; and
    a second camera attached to the second holding fixture and directed to a front of the vehicle;
    wherein the first holding fixture is extended and the first camera is powered when the vehicle is in reverse; and
    wherein the second holding fixture is extended and the second camera is powered when the vehicle is in forward and traveling at a low rate of speed.

11. A holding fixture system for a camera on a vehicle, comprising:
    a camera;
    a holding fixture for the camera, the holding fixture being attached to a body shell of the vehicle, wherein the camera is mounted on the holding fixture, and wherein the holding fixture is configured to be selectively drawn out of the body shell, and wherein the holding fixture is integrated into a vehicle-manufacturer emblem that is attached to a trunk lid, and wherein the vehicle-manufacturer emblem is configured to selectively open to enable the holding fixture to be drawn out of the body shell, the holding fixture being extended in response to the vehicle traveling in reverse, and the holding fixture being retracted again in response to (a) forward travel and (b) a predefined speed value being exceeded.

12. The holding fixture system according to claim 11, wherein:
the holding fixture is drawn out as a function of a transmission-setting signal.

13. The holding fixture system according to claim 11, wherein:
the holding fixture is drawn out as a function of a signal from a control element.

14. A holding fixture system for a camera on a vehicle, comprising:
a camera;
a holding fixture for the camera, the holding fixture being attached to a body shell of the vehicle, wherein the camera is mounted on the holding fixture, and wherein the holding fixture is configured to be selectively drawn out of the body shell as a function of a speed signal, and wherein the holding fixture is integrated into a vehicle-manufacturer emblem that is attached to a trunk lid.

* * * * *